United States Patent [19]

Shiroto et al.

[11] 4,367,164

[45] Jan. 4, 1983

[54] CATALYSTS FOR HYDROTREATING HEAVY HYDROCARBON OILS AND A METHOD OF PREPARING SUCH CATALYSTS

[75] Inventors: Yoshimi Shiroto; Takehito Higashi, both of Yokohama; Takeo Ono, Kawasaki, all of Japan

[73] Assignee: Chiyoda Chemical Engineering & Construction Co., Ltd., Yokohama, Japan

[21] Appl. No.: 210,048

[22] Filed: Nov. 24, 1980

[30] Foreign Application Priority Data

Nov. 27, 1979 [JP] Japan .................. 54-153131

[51] Int. Cl.$^3$ .................. B01J 21/16; B01J 21/00
[52] U.S. Cl. .................. 252/457; 252/432; 252/456
[58] Field of Search .................. 252/457, 432, 456

[56] References Cited

U.S. PATENT DOCUMENTS

| | | | |
|---|---|---|---|
| 3,089,908 | 5/1963 | Schult et al. | 252/457 X |
| 3,695,856 | 10/1972 | Paul et al. | 252/457 X |
| 4,166,026 | 8/1979 | Fukui et al. | 252/457 X |
| 4,196,102 | 4/1980 | Inooka et al. | 252/457 |

Primary Examiner—Carl F. Dees
Attorney, Agent, or Firm—Armstrong, Nikaido, Marmelstein & Kubovcik

[57] ABSTRACT

A catalyst for hydrotreating heavy hydrocarbon oils comprises a carrier which is a calcined composite of a mixture of a clay mineral consisting mainly of magnesium silicate having a double-chain structure and at least one oxide-forming substance selected from the group consisting of the compounds of the elements belonging to Groups IIA, IIIA, IVA and IVB of the Periodic Table and capable of forming an oxide upon calcination, and at least one catalytic metal component composited with the carrier. The metal of the catalytic metal component is selected from among those belonging to Groups VB, VIB, VIII and IB of the Periodic Table. The catalyst contains about 5 to 80% by weight of the oxide formed from the oxide-forming substance and about 0.1 to 20% by weight of the catalytic metal component in terms of elemental metal. The catalyst has a pore volume of about 0.5 to 2.0 cc/g, an average pore diameter of about 100 to 500 Å, and a surface area of about 40 to 400 m$^2$/g. Disclosed also are a method of preparing such a catalyst, and a process for hydrotreating heavy hydrocarbon oils in the presence of such a catalyst.

14 Claims, 4 Drawing Figures

CATALYSTS FOR HYDROTREATING HEAVY HYDROCARBON OILS AND A METHOD OF PREPARING SUCH CATALYSTS

BACKGROUND OF THE INVENTION

1. Field of the Invention

This invention relates to a novel catalyst useful for hydrotreating heavy hydrocarbon oils and a method of preparing such a catalyst. This invention is also concerned with a process for hydrotreating heavy hydrocarbon oils using such a catalyst.

2. Description of the Prior Art

Heavy hydrocarbon oils, such as heavy crude oils, reduced crude oils, vacuum residues, heavy oils extracted from tar sand and mixtures thereof, contain non-distillable, high molecular coke precursors, usually called asphaltenes, which are insoluble in light hydrocarbons such as pentane and heptane, and undesirable impurities such as oil-soluble organic metal compounds containing vanadium, nickel or the like and sulfur or nitrogen compounds. These impurities are often found for the greater part in high molecular hydrocarbon fractions, such as asphaltenes. This is a significant cause for the difficulty involved in the catalytic hydrotreatment of heavy hydrocarbon oils. The term 'hydrotreatment' used herein means the treatment of heavy hydrocarbon oils in a hydrogen atmosphere for the purpose of converting asphaltenes and other high molecular hydrocarbon fractions in the heavy hydrocarbon oil into distillable hydrocarbon fractions, or hydrocarbon fractions which are soluble in a light hydrocarbon, to thereby reduce any such high molecular fraction, and simultaneously removing or reducing the aforementioned metal, sulfur and nitrogen compounds.

Hydrodesulfurization or hydrocracking are known to be effective processes for obtaining high grade light oils from heavy hydrocarbon oils on a commercial scale. These processes employ a fixed or ebullated bed of a catalyst composed of a metal such as cobalt, nickel, molybdenum and tungsten supported on a carrier formed of activated alumina such as $\gamma$-alumina, $\eta$-alumina and $\chi$-alumina, or silica, silica-alumina, silica-magnesia, or the like. [M. W. Ranney, Chemical Technology Review No. 54, "Desulfurization of Petroleum", Noyes Data Corporation, New Jersey (1975).] These processes, however, encounter a number of problems if the heavy hydrocarbon oil to be treated contains asphaltenes and heavy metals. The asphaltenes in the oil are in the form of colloidally dispersed macromolecules and cannot easily diffuse into the active sites in the pores of the catalyst. This seriously inhibits the hydrocracking of asphaltenes. The presence of asphaltenes heavily promotes the formation of coke and carbonaceous matter, which leads to a considerable reduction in the activity of the catalyst. These problems define a great obstacle to the industrial-scale hydrotreatment of heavy hydrocarbon oils.

A further problem, which is as important as those hereinabove discussed, arises due to the presence of a large amount of heavy metals in the oil. These metals can deposit on the catalyst surface during hydrotreatment, thereby to poison the catalyst and shorten its life sharply.

The catalytic hydrotreatment of heavy hydrocarbon oils by the known processes requires frequent renewal of the catalyst, resulting in an increase in consumption of the catalyst per unit quantity of the oil to be treated. In the event the known process is selectively intended for decomposing asphaltenes to produce light oil, it is necessary to use the catalyst under severe conditions so that the degradation of the catalyst is further promoted and the light oil produced undergoes cracking and gasification. This disables high-yield production of light oil, and brings about a seriously uneconomical increase in the consumption of hydrogen.

Members of the group to which the inventors of this invention belong have been engaged in extensive research for several years with a view to finding out a catalyst which overcomes the aforementioned disadvantages of the known catalyst and which is effective for the catalytic hydrotreatment of heavy hydrocarbon oils. As a result, they have discovered that a sepiolite catalyst has a high activity for the hydrotreatment of hydrocarbons, particularly for the removal of metals therefrom. They have already obtained patent protection for a novel process for removing metals from hydrocarbons by using such a catalyst, and a process for preparing the catalyst (U.S. Pat. Nos. 4,152,250 and 4,196,102).

They have also discovered that clay minerals of the double-chain structure, including sepiolite, have a pore structure which is effective for the hydrotreatment of heavy hydrocarbon oils, and that a specific type of vanadium sulfide carried on such a clay mineral has a high activity for the hydrotreatment of heavy hydrocarbon oils, particularly for the decomposition of asphaltenes and the removal of heavy metals therefrom. This discovery forms a basis for U.S. patent application Ser. No. 84,764.

There have been many proposals which suggest addition of a second component into a solid oxide catalyst as a filler, diluent, dispersant, molding assistant or reinforcing agent, or the like (U.S. Pat. No. 3,118,845, British Pat. No. 1,218,080, Japanese Patent Publication No. 31,878/1974, Japanese Laid-Open patent application Nos. 36,595/1974, 40,494/1975, 142,492/1975 and 82,690/1977, etc.). The aforementioned U.S. Pat. Nos. 4,152,250 and 4,196,102 also teach that it is effective to add an ordinary alumina sol as a molding assistant. None of them, however, teaches addition of a second component, other than the catalyst metal, for the purpose of improving the surface activity of the catalyst composed of a clay mineral consisting mainly of magnesium silicate of the double-chain structure.

SUMMARY OF THE INVENTION

The present invention provides a catalyst for hydrotreating heavy hydrocarbon oils, which comprises a carrier which is a calcined composite of a mixture of a clay mineral consisting mainly of magnesium silicate having a double-chain structure and at least one oxide-forming substance selected from the group consisting of the compounds of the elements belonging to Groups IIA, IIIA, IVA, IVB of the Periodic Table and capable of forming an oxide upon calcination, and at least one catalytic metal component composited with the carrier, the metal of the catalytic metal component being selected from the group consisting of the metals belonging to Group VB, VIB, VIII and IB of the Periodic Table. The catalyst contains between about 5 and about 80% by weight of the oxide formed from the oxide-forming substance and between about 0.1 and about 20% by weight of the catalytic metal component in terms of elemental metal. The catalyst has a pore volume of between about 0.5 and about 2.0 cc/g, an average pore diameter of between about 100 and about 500 Å, and a surface area of between about 40 and about 400 m²/g.

For the purpose of this specification, the 'Periodic Table' is one appearing on page 628 of Webster's Seventh New Collegiate Dictionary, G & C Merriam Company, Springfield, Massachusetts (1965).

The catalyst of this invention has a very high activity for the various reactions involved in hydrotreatment of heavy hydrocarbons, such as asphaltene decomposition, vanadium removal and desulfurization, as compared with known clay mineral catalysts disclosed, for example, in U.S. Pat. No. 4,152,250. It has been found out that if the amount of the oxide-forming substance to be added to the clay mineral is maintained within a specific range, the catalyst has a surprisingly improved surface activity without impairing the porous structure of the clay mineral catalyst which is effective for the selective decomposition of asphaltenes.

Although the reason for the high activity of the catalyst according to this invention has not yet fully been analyzed, it is presumed from the qualitative standpoint that the specific oxide-forming substance uniformly dispersed in the clay mineral can form, upon calcination, a layer of appropriately grown crystals of the oxide on the catalyst surface in a way which is totally different from the mere incorporation of the oxide into the clay mineral. It is considered that the dispersion of the catalytic metal component responsible for the activity of the catalyst is promoted on the catalyst surface, and that the chemical nature of the catalyst surface is improved, resulting in the development of a novel catalytic action which is established by the cooperation of the clay mineral, the oxide formed from the oxide-forming substance and the catalytic metal component, and which is different from the effect obtained by any known catalyst composed solely of the clay mineral and the catalytic metal component.

In another aspect of this invention there is provided a method of preparing such a catalyst. The present invention also provides a process for hydrotreating heavy hydrocarbon oils by using such a catalyst.

It is, therefore, an object of the present invention to provide a novel catalyst which is effective for hydrotreating an asphaltene-containing heavy hydrocarbon oil, especially in decomposing asphaltenes and concomitantly removing heavy metals therefrom.

Another object of this invention is to provide a catalyst which is devoid of the afore-mentioned drawbacks of the conventional catalysts and which can exhibit a high degree of activity for a long period of time.

A further object of this invention is to provide a simple and economically acceptable method by which a catalyst suitable for hydrotreating asphaltene-containing heavy oils can be obtained.

It is yet a further object of this invention to provide a process for hydrotreating a heavy hydrocarbon oil, especially an oil containing large amounts of asphaltenes and heavy metals, by which such an oil can be effectively converted into a substantially asphaltene-free and heavy metal-free light oil.

BRIEF DESCRIPTION OF THE DRAWINGS

Other objects, features and advantages of the present invention will become apparent from the detailed description of the invention to follow when considered in light of the accompanying drawings in which.

DETAILED DESCRIPTION OF THE INVENTION

The novel catalyst of this invention is comprised of a specific carrier which is a calcined product of a mixture of a clay mineral consisting mainly of a magnesium silicate of the double-chain structure and at least one oxide-forming substance selected from the compounds of the elements belonging to Groups IIA, IIIA, IVA and IVB of the Periodic Table. At least one catalytic metal component containing the metal belonging to Groups VB, VIB, VIII and IB of the Periodic Table is composited with the carrier.

Suitable examples of the clay mineral are sepiolite, attapulgite and palygorskite. These clay minerals have a crystal form of the double-chain structure as shown in The Handbook of Clays (1967) compiled by The Japanese Society of Clays, page 48. They have a double-chain lattice structure which is basically a chain structure similar to that of amphibole, as opposed to the other clay minerals having a layer lattice structure. The crystals of attapulgite have a fibrous form. Known sepiolite is classified into α-sepiolite composed of fibrous or tubular crystals, and β-sepiolite composed of irregular flaky crystals. Naturally available sepiolite is often a mixture of these two types of sepiolite. Palygorskite is similar to attapulgite, but is generally formed hydrothermally, while attapulgite is a mineral produced in deposits and having a low degree of crystallinity. Both palygorskite and attapulgite belong to the sepiolite-paramontmorillonite group.

Naturally available minerals named above have different chemical compositions according to the place where they are produced, but generally, their compositions fall within the following ranges. For the purpose of this invention, the clay mineral consisting mainly of magnesium silicate of the double-chain structure may be sepiolite containing 46 to 53% by weight of $SiO_2$, 0.6 to 8% by weight of $Al_2O_3$, 0.7 to 22% by weight of $Fe_2O_3$, 0.7 to 3% by weight of FeO, 12 to 23% by weight of MgO, 0.5 to 1% by weight of CaO, 8 to 13% by weight of $H_2O$ (+) and 8 to 11% by weight of $H_2O$ (−); attapulgite containing 53 to 58% by weight of $SiO_2$, 8 to 11% by weight of $Al_2O_3$, 2 to 4% by weight of $Fe_2O_3$, 0.2% by weight or less of FeO, 8 to 11% by weight of MgO, 1 to 2% by weight of CaO, 0.3% by weight or less of $K_2O$, 1% by weight or less of $Na_2O$, 8 to 12% by weight of $H_2O$ (+) and 8 to 10% by weight of $H_2O$ (−); or palygorskite containing 52 to 62% by weight of $SiO_2$, 6 to 19% by weight of $Al_2O_3$, 0.8 to 4% by weight of $Fe_2O_3$, 0.2 to 0.8% by weight of FeO, 5 to 15% by weight of MgO, 0.1 to 3% by weight of CaO, 10 to 14% by weight of $H_2O$ (+) and 6 to 11% by weight of $H_2O$ (−). They can be used individually, or in the form of an appropriate mixture. Each value of $H_2O$ (−) indicates a reduction in the weight of the sample dried in an air bath at a temperature of 105° C. to 110° C., while each $H_2O$ (+) value shows a difference between $H_2O$ (−) and a reduction in weight caused by soaking.

When they exist in nature, all of these minerals often have a part of magnesium replaced by a divalent or trivalent metal, such as Fe, Cr, Mn and Cu, or contain impurities, such as dolomite and other clay minerals, or amorphous silica, silica-alumina and silica-magnesia.

Each of the aforementioned clay minerals has a unique physical structure which is attributable to its own crystal structure. For example, sepiolite produced in Spain in a clayey mineral containing a considerably large amount of fibrous crystals, and having a surface area of 150 to 200 $m^2/g$ and a pore volume of 0.3 to 1.0 cc/g. Korean sepiolite is an asbestos-like mineral composed virtually wholly of fibrous crystals, and having a surface area of 50 to 400 $m^2/g$ and a pore volume of 0.3 to 3.0 cc/g. Japanese sepiolite produced in Akan, Hokkaido has a considerably great part of magnesium replaced by Fe, and has a surface area of 150 $m^2/g$ and a pore volume of 0.9 cc/g.

An adsorbent sold by Engelhard under the name of Sol Speedi Dri is a kind of attapulgite available in nature, and a clayey substance having a surface area of 120 $m^2/g$ and a pore volume of 0.5 cc/g. Palygorskite produced in Syria is a powder having a surface area of 120 $m^2/g$ and a pore volume of 0.6 cc/g. These clay minerals, which are naturally available, are somewhat different from one another in physical properties and the form in which they exist, but all of them are porous, and contain a lot of fibrous crystals as examined through an electron microscope.

Figure 1:
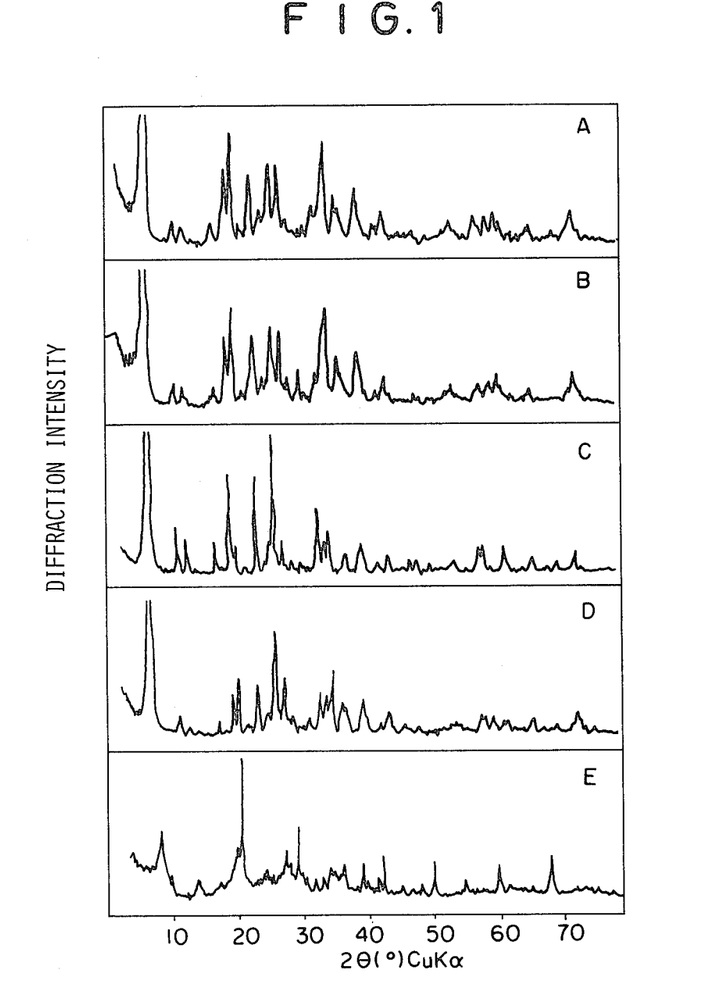
FIG. 1 shows the X-ray diffraction spectra of typical examples of clay minerals consisting mainly of magnesium silicate.

FIG. 1 shows the X-ray diffraction spectra of typical examples of clay minerals consisting mainly of magnesium silicate. In FIG. 1, 'A' refers to sepiolite produced in Madrid, Spain, 'B' to sepiolite produced in Toledo, Spain, 'C' to fibrous sepiolite produced in Korea, 'D' to iron sepiolite produced in Japan, and 'E' to attapulgite produced in the United States.

The oxide-forming substance to be incorporated into the clay mineral is a compound of the element belonging to Groups IIA, IIIA, IVA or IVB of the Periodic Table, and is capable of forming an oxide when calcined. Preferred examples of the oxide-forming substance include magnesium of Group IIA, boron and aluminum of Group IIIA, silicon of Group IVA and titanium and zirconium of Group IVB. The oxide-forming substance exists in the form of an oxide or composite oxide on the catalyst which is calcined and ready for use. The catalyst should contain the oxide formed from the oxide-forming substance in an amount of between about 5 and about 80% by weight.

The catalytic metal component defining a source of catalytic activity comprises at least one transition metal selected from those belonging to Groups VB, VIB, VIII and IB of the Periodic Table. Among others, vanadium, molybdenum, tungsten, chromium, cobalt, nickel and copper are particularly preferred. The catalytic metal component may be a metal itself, or an oxide or sulfide thereof. Alternatively, a part of the catalytic metal component may be combined, by way of ion exchange, with the carrier formed from the clay mineral and the oxide-forming substance. The amount of the catalytic metal component in the catalyst should be in the range of between about 0.1 to and about 20% by weight in terms of elemental metal. The catalytic metal component governs the activity of the catalyst for various reactions involved in the hydrotreatment of heavy hydrocarbon oils, such as decomposition of asphaltenes, removal of heavy metals, desulfurization and denitrification. The selection of the catalytic metal component and the combination of the metals, if a plurality of metals are employed, depend on the type of the reaction which is considered most important on a case to case basis. For example, if the catalyst is intended for use particularly in the decomposition of asphaltenes and the removal of heavy metals from heavy hydrocarbon oils, it is effective to use such a metal as vanadium, molybdenum and copper, or a combination thereof with at least one of cobalt, nickel, tungsten and chromium. If it is additionally desired to promote the activity of the catalyst for desulfurization, it is desirable to employ such a combination of metals as cobalt and molybdenum; nickel, cobalt and molybdenum; vanadium, cobalt and molybdenum; and vanadium, nickel, cobalt and molybdenum.

The catalyst of this invention may be prepared by a variety of processes, as long as such processes can produce a catalyst having a pore volume of between about 0.5 and about 2.0 cc/g, an average pore diameter of between about 100 and about 500 Å, and a surface area of between about 40 and about 400 $m^2/g$. The features of the pores in the catalyst, particularly their volume, average diameter and surface area, have a significant bearing on the effective hydrotreatment of heavy hydrocarbon oils, and define an important factor for achieving the optimum activity and life for the catalyst. The catalyst of this invention has a physical structure which is suitable for easy diffusion of high molecular hydrocarbon fractions, such as asphaltenes, into the active sites in the pores of the catalyst during the hydrotreatment of heavy hydrocarbon oils of which the success depends on such diffusion into the pores.

The catalyst is required to have a sufficiently large pore volume for holding a sufficient amount of metal for maintaining a reasonably long catalyst life, but if it is too large, the catalyst has a low bulk density, a low activity per unit volume which it fills, and a low mechanical strength. Therefore, the catalyst should have a pore volume of between about 0.5 and about 2.0 ml/g. The pore diameter and surface area of the catalyst are important in relation to the diffusion of the reactant material into the pores and the activity of the catalyst. The pore diameter should be sufficiently large to permit easy diffusion of macromolecules, such as asphaltenes, into the pores, but since too large a pore diameter reduces the surface area of the catalyst and lowers its activity, it is necessary to maintain the pore diameter within the range of between about 100 and about 500 Å. The surface area of the catalyst must be in the range of between about 40 and about 400 $m^2/g$.

For the purpose of this specification, the pore volume, average pore diameter and surface area of the catalyst were determined by a mercury penetration method using a porosimeter Model 70 made by Carlo Erba, Milano, Italy at a catalyst angle of 140°, a maximum mercury pressure of 2,000 $kg/cm^2$ and a mercury surface tension of 474 dyne/cm at 25° C. Their calculations were conducted in accordance with the methods described on pages 70 to 73 of Catalytic Engineering Course 4, "Methods for Fundamental Measurements for Catalysts", Chijin Shokan, Publishers (1969). The pore volume, average pore diameter and surface area were measured with regard to pores having a diameter of at least 75 Å.

Moreover, it is preferred that the catalyst of this invention have the following physical properties:

(1) An average diametrical breaking strength is at least 1 kg/5 mm; and
(2) A bulk density is between about 0.2 and about 1 g/cc.

Figure 2:
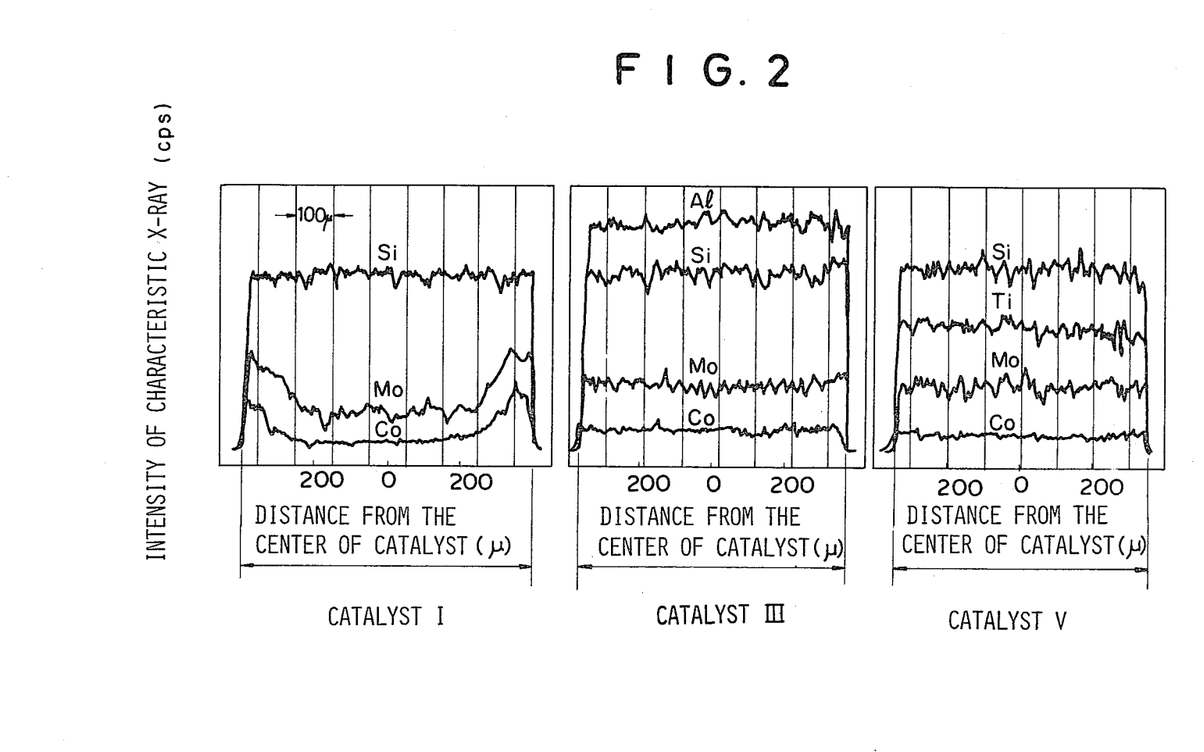
FIG. 2 shows the results of analysis of catalysts I, III and V by an X-ray microanalyzer.

It has been found that the oxide derived from the oxide-forming substance and catalytic metal component are uniformly distributed in the catalyst. The dispersion in the catalyst particles of these components were examined by a Shimazu EMXSM electron probe microanalyzer with a beam diameter of 1μ, a beam current of 0.05 μA and a voltage of 20 kV. This examination was made for Catalysts III and V prepared by the process of this invention as hereinafter described, and containing 2% by weight of cobalt and 6% by weight of molybdenum, respectively, in oxide form on a carrier composed of sepiolite and 25% by weight each of alumina and titania, respectively, and, for the sake of comparison, Catalyst I containing the same amounts of cobalt and molybdenum carried on sepiolite. The results of the examination are shown in FIG. 2. As is obvious from FIG. 2, the elements, Al and Ti as well as the catalytic metal components, Co and Mo, are uniformly distributed in Catalysts III and V according to this invention. On the other hand, the metals, Co and Mo, are not uniformly distributed in Catalyst I, but are deposited more densely in the vicinity of the inlets of pores than anywhere else.

According to this invention, therefore, the oxide formed from the oxide-forming substance ensures a uniform and satisfactory distribution of the catalytic metal component throughout the catalyst. Its pores are, therefore, least likely to be capped or closed by the metal deposited around their inlets. Moreover, a satisfactorily high activity of the catalyst can be achieved with only a small amount of metal. The highly uniform distribution of the catalytic metal component on the catalyst of this invention is of practically great importance, in view of the general tendency for a large amount of carbonaceous matter to be deposited on the catalyst surface during the catalytic hydrotreatment of heavy hydrocarbon oils if the catalyst carries a large quantity of the catalytic metal component.

In addition, the catalyst of this invention has been found to have a desirable acidity. Differences in the acidity of the catalyst surface were examined in order to illustrate the improvement in the chemical nature of the catalyst of this invention. The determination of the acidity was conducted in accordance with the thermal desorption method described by Y. Amenomiya, J. Catal., 46, 326 (1977). The amounts of ammonia adsorbed by Catalysts III, V and I were as follows:

|  | Amount of ammonia adsorbed (m mol/g) |
| --- | --- |
| Catalyst III | 0.33 |
| Catalyst V | 0.30 |
| Catalyst I | 0.20 |

The amount of ammonia adsorbed is equal to the amount of ammonia desorbed at a temperature from 200° C. to 600° C. per unit weight of the catalyst. It is a value which is related to the acidity of the catalyst surface. As is obvious from the above table, Catalysts III and V of this invention have a sharply increased acidity, as compared with Catalyst I in which no oxide-forming substance is employed.

The surface of the catalyst according to this invention has, thus, an improved chemical nature. Generally, high molecular hydrocarbons, such as asphaltenes, are polycyclic aromatic compounds and have a strong polarity (or basicity) because they contain hetero-atoms, such as S, N and O. In hydrotreating a heavy hydrocarbon oil containing a large quantity of asphaltenes, therefore, it is considered effective to use a catalyst having a highly acidic surface, since it has a high power of adsorbing the reactant material. The high activity of the catalyst of this invention owes partly to its chemically improved surface.

An amount of the oxide formed from the oxide-forming substance serves as an important factor for achieving the desired properties of the catalyst, i.e. the excessive use of the oxide-forming substance will seriously disturb the pore structure of the clay mineral which is effective for the hydrotreatment of heavy hydrocarbon oils. For example, the following table shows typical physical properties of Catalysts III, V and I, and Catalyst VIII which is similar to Catalysts III and IV but contains 83% by weight of titania.

|  | Catalyst | | | |
| --- | --- | --- | --- | --- |
|  | III | V | I | VIII |
| Surface area (m²/g) | 135 | 105 | 104 | 58 |
| Pore volume (cc/g) | 0.59 | 0.57 | 0.70 | 0.31 |
| Average pore diameter (Å) | 203 | 217 | 269 | 213 |

As is obvious from the table above, Catalyst VIII is highly inferior to Catalyst I both in its surface area and pore volume, but the pore characteristics of Catalysts III and V are nearly equal to those of Catalyst I. This indicates that the pore structure of the clay mineral is maintained if the amount of the oxide-forming substance is appropriate. The catalyst of this invention should contain between about 5 and about 80% by weight of the oxide formed from the oxide-forming substance.

The novel catalyst of this invention can be prepared by a method which includes the steps of (a) commingling the above-described oxide-forming substance with the above-described clay mineral in the presence of water to obtain a mixture having a water content of between 40 and 80% by weight; (b) molding the mixture into a desired shape; (c) supporting a catalytic component on the mixture; and (d) calcining the mixture.

The clay mineral may be pretreated before the commingling step, if necessary. Suitable pretreatment includes heat treatment, grinding treatment and/or chemical treatment. The heat treatment comprises heating the clay mineral for drying and in some cases for decomposing impurities contained therein. Grinding of the clay mineral is generally conducted by either a wet or dry method so as to pulverize it into a particle size of 50 mesh or finer. Chemical treatment is conducted to remove impurities such as amorphous silica and includes washing the clay mineral with an acidic or alkaline aqueous solution. Treatment of the clay mineral with an aqueous solution of sodium carbonate or sodium chloride is also effective to deactivate calcium ion by converting it into sodium ion.

The commingling (step (a)) may be preferably performed by kneading a mixture of the clay mineral, the oxide-forming substance and water by means of an ordinary kneader machine. The oxide-forming substance is added into the clay mineral in such an amount that the catalyst ultimately produced may contain 5 to 80% by weight of oxide components derived from the oxide-forming substance. The water content in the mixture is maintained at about 40 to 80% by weight.

Step (a) may also be carried out by the following way. The clay mineral is added with water in an amount at least three times by weight as much as the clay mineral, and the mineral and the water are thoroughly mixed by means of a paddle type agitator, homogenizer, colloid mill or the like. A predetermined quantity of the oxide-forming substance is added into the mixture before, during or after such agitation, whereby a pasty mixture in the form of a gel or sol is prepared. It is preferred that aqueous ammonia, sodium hydroxide, potassium hydroxide, hydrochloric acid, nitric acid, an organic acid or the like be added into the mixture to control it to a pH range of 4 to 11 so as to prevent dissolution of the sol or gel. The mixture in the form of a gel refers to a milky and emulsified mixture which is highly viscous and has a very low fluidity, while the mixture in the form of a sol indicates a uniform dispersion having a high degree of fluidity. For the purpose of this invention, either form may be satisfactory, and it depends on the nature of the starting materials, the amount of the water added and the method of agitation employed.

For the purpose of promoting the gelation or solation of the mixture, or improving the peptization of the fibrous clay mineral, it may be effective to heat the mixture, or treat it with ultrasonic waves, or add thereinto ammonium chloride, ammonium nitrate, ammonia, potassium hydroxide, or a peptizing agent such as sodium hexametaphosphate known under the trade name of Calgon, sodium pyrophosphate and sodium silicate. The mixture in the form of a gel or sol is formed into a cake having a water content of about 40 to 80% by weight by drying, or by atmospheric, vacuum or pressure filtration, or centrifugal separation, or the like methods.

The kneaded or mixed product prepared as described above has its water content adjusted to about 40 to 80% by weight, and is then extrusion or granulation molded (step b). The extrusion molded product may be columnar or hollow cylindrical, or may have a cross section which is non-circular, for example, oval or multilobed, such as trilobate. The granulation molded product may be formed by an appropriate method, such as by prilling, dropping in oil, and wet granulation.

The molded product from step (b) is dried at a temperature of about 100° C. to 200° C. for about 0.5 to 24 hours until its solid content becomes at least about 25% by weight, and then, it is calcined at a temperature of 200° C. to 800° C. for about 0.5 to 10 hours (step d). Before it is so dried, the molded product may sometimes be allowed to stand at room temperature for at least one whole day and night. It is, thus, possible to form a calcined molded product having a pore volume of about 0.5 to 2.0 cc/g, an average pore diameter of about 100 to 500 Å and a surface area of about 40 to 400 m²/g, if various factors are appropriately selected, including the degree to which the clay mineral and oxide-forming substance are kneaded or mixed, the pH of the mixture, the amount of water which it contains when molded, and the temperature, rate and time at or for which it is dried or calcined.

Specific examples of the oxide-forming substance of this invention are as follows.

Magnesium of Group IIA may be used in the form of, for example, magnesium hydroxide, $Mg(OH)_2$; magnesium oxide, $MgO$; magnesium carbonate, $MgCO_3$ or $MgCO_3.3H_2O$; magnesium nitrate, $Mg(NO_3)_2.6H_2O$; magnesium chloride, $MgCl_2.6H_2O$; or magnesium sulfate, $MgSO_4.7H_2O$.

Boron or Group IIIA may be employed in the form of, for example, boric acid, $H_3BO_3$; ammonium borate, $NH_4B_5O_8.4H_2O$; sodium borate, $Na_2B_4O_7.10H_2O$; or sodium perborate, $NaBO_3.4H_2O$. Aluminum or Group IIIA may be in the form of, for example, metallic aluminum (Al); aluminum chloride, $AlCl_3$ or $AlCl_3.6H_2O$; aluminum nitrate, $Al(NO_3)_3.9H_2O$; aluminum sulfate, $Al_2(SO_4)_3$ or $Al_2(SO_4)_3.18H_2O$; aluminum polychloride, $(Al_2(OH)_nCl_{6-n})_m$ wherein $1 < n < 5$ and $m < 10$; alum, $(NH_4)_2SO_4.Al_2(SO_4)_3.24H_2O$; sodium aluminate, $NaAlO_2$; potassium aluminate, $KAlO_2$; aluminum isopropoxide, $Al[OCH(CH_3)_2]_3$; aluminum ethoxide, $Al(OC_2H_5)_3$; aluminum t-butoxide, $Al[OC(CH_3)_3]_3$; or aluminum hydroxide, $Al(OH)_3$.

Silicon of Group IVA may be in the form of, for example, colloidal silica, $SiO_2.xH_2O$, which is a colloidal solution of ultrafine particles of silicon oxide or silicic anhydride, ultrafine anhydrous silica, $SiO_2$; sodium silicate, $Na_2O.xSiO_2.yH_2O$ ($x = 1$ to 4); silicon tetrachloride, $SiCl_4$; or silicic ester, $Si(OCH_3)_4$ or $Si(OC_2H_5)_4$.

Titanium of Group IVB may be used in the form of, for example, orthotitanic acid, $H_4TiO_4$; metatitanic acid, $H_2TiO_3$; titanium dioxide, $TiO_2$; titanium chloride, $TiCl_3$ or $TiCl_4$; titanium sulfate, $Ti_2(SO_4)_3$ or $Ti(SO_4)_2$; titanium oxysulfate, $TiOSO_4$; titanium bromide, $TiBr_4$; titanium fluoride, $TiF_3$ or $TiF_4$; or titanic ester, $Ti[O.CH(CH_3)_2]_4$. Zirconium of Group IVB may be in the form of, for example, zirconyl chloride, $ZrCl_2O.8H_2O$; zirconyl hydroxide, $ZrO(OH_2)$; zirconyl sulfate, $ZrO(SO_4)$; sodium zirconyl sulfate, $ZrO(SO_4).Na_2SO_4$; zirconyl carbonate, $ZrO(CO_3)$; ammonium zirconyl carbonate, $(NH_4)_2ZrO(CO_3)_2$; zirconyl nitrate, $ZrO(NO_3)_2$; zirconyl acetate, $ZrO(C_2H_3O_2)_2$; ammonium zirconyl acetate, $(NH_4)_2ZrO(C_2H_3O_2)_3$; zirconyl phosphate, $ZrO(HPO_4)_2$; zirconium tetrachloride, $ZrCl_4$; zirconium silicate, $ZrSiO_4$; or zirconium oxide, $ZrO_2$.

These oxide-forming substances may be added into the clay mineral directly, but preferably in the form of a hydroxide, hydrate, or the like. The form in which it is added to the clay mineral will hereunder be described by way of example.

If magnesium of Group IIA is taken for example, an aqueous solution containing a magnesium salt is maintained at a temperature of 10° C. to 100° C., and an alkaline solution is added into the aqueous solution to control it to pH 6 to 11, whereby a magnesium hydroxide hydrogel is formed. The gel is preferably aged at a temperature of 50° C. to 100° C. for 0.5 to 24 hours. If aqueous ammonia is used as an alkali for forming a precipitate of magnesium hydroxide, the magnesium ions do not completely turn into magnesium hydroxide, but a part of magnesium is lost in the form of its ions during the filtration or washing operation. If a large quantity of an ammonium salt is present, magnesium hydroxide is less likely to precipitate. Accordingly, the utmost care should be taken to prevent the loss of magnesium and avoid the presence of an ammonium salt if aqueous ammonia is used as a precipitant for magnesium hydroxide. An alkalinity of, say, at least pH 11 is usually preferred for precipitating magnesium hydroxide completely. Therefore, it is desirable to employ a strongly alkaline substance, such as sodium or potassium hydroxide, for the precipitation of magnesium hydroxide.

A precipitate of magnesium hydroxide hydrogel may also be obtained by treating magnesium oxide hydrothermally. According to this method, magnesium carbonate is heated to about 1,000° C. in air to form magnesium oxide, and it is hydrothermally treated at a temperature of about 200° C. to about 300° C. in an autoclave, whereby a magnesium hydroxide hydrogel is formed.

All impurities and salt are carefully removed from the magnesium hydroxide hydrogel produced by any of the aforementioned methods by washing with water or any suitable washing medium before the magnesium hydroxide hydrogel is used as the oxide-forming substance for the catalyst of this invention.

The magnesium hydroxide hydrogel thus obtained is hardly soluble in water, easily soluble in a dilute acid, soluble in an excess ammonium salt, and insoluble in an excess alkali hydroxide. If it is fully dried at about 110° C., the resulting magnesium hydroxide has a surface area of about 10 to 100 m$^2$/g, and a crystal size of about 50 to 500 Å, which can be examined by X-ray diffraction. If it is further heated to at least 400° C., the resulting magnesium oxide has a surface area of about 50 to 300 m$^2$/g.

Boron belonging to Group IIIA of the Periodic Table may be used for the oxide-forming substance in the form of a compound thereof as it is, or in the form of an aqueous solution thereof.

If aluminum is selected, it is preferable to use gibbsite, bialite, boehmite, pseudoboehmite, diaspore, amorphous alumina gel, or any other alumina hydrate. Gibbsite may be obtained as a precipitate by blowing carbon dioxide into an aqueous solution of sodium aluminate at a temperature of at least 60° C., or as an intermediate during the manufacture of aluminum by the Bayer process. Bialite may be prepared by controlling an aqueous solution of an aluminum salt or alkali aluminate to a pH range of 10 to 13 at room temperature or by blowing carbon dioxide into an aqueous solution of alkali alumina. Boehmite may be formed if an alumina trihydrate or amorphous alumina gel is hydrothermally treated at a temperature of about 150° C. to about 380° C. in an autoclave. Diaspore may be prepared if an alumina hydrate and a small amount of diaspore are hydrothermally treated in an autoclave at a temperature of about 275° C. to about 425° C. and a pressure of at least 140 atmospheres. Pseudoboehmite can be formed by aging an amorphous alumina gel at a temperature of at least 25° C. in an aqueous medium, or neutralizing an aluminum salt or alkali aluminate at room temperature or a higher temperature.

A method disclosed in Japanese Laid-Open Patent Application No. 27,830/1980 may also suitably be adopted. According to the process disclosed therein, an alkali is added into an aqueous solution of a strong acid salt of aluminum, such as aluminum nitrate, chloride or sulfate, or an acid or a strong acid salt of aluminum is added into an aqueous solution of sodium aluminate or potassium aluminate, whereby a seed aluminum hydroxide hydrosol is formed. A slurry containing these seed particles is controlled to pH 6 to 10 and held at a temperature of at least 50° C. An aluminum salt, such as aluminum nitrate, chloride or sulfate, and sodium or potassium aluminate, is then added into the slurry to control it to pH 5 or below, or pH 11 or above and to dissolve fine crystallites of aluminum hydroxide. Subsequently, a neutralizing agent is added into the slurry to return it to pH 6 to 10 and to effect the growth of crystallites of aluminum hydroxide. The procedures hereinabove described are repeated a plural times, whereby a coarse aggregate mass of an alumina hydrogel is formed. The amount of the aluminum salt added every time to the slurry is 2 to 200 mol %, in terms of oxide, based on the amount, in terms of oxide, of the aluminum hydroxide contained in the slurry.

An amorphous alumina gel may be formed by neutralizing an aluminum salt or alkali aluminate or by hydrolyzing aluminum alkoxide.

For silicon belonging to Group IVA of the Periodic Table, it is desirable to employ a silica hydrate. For preparing a silica hydrate, a dilute sodium silicate solution having a silica content of 0.5 to 15% weight, preferably 1 to 8% by weight, is uniformly mixed with a mineral acid, such as sulfuric, hydrochloric, phosphoric or nitric acid. The mixed solution is controlled to a temperature of 0° C. to 100° C., preferably 10° C. to 70° C., and a pH range of 3 to 11, preferably 6 to 10, whereby a silica hydrogel is precipitated. The silica hydrogel is aged at a temperature of 10° C. to 70° C. and a pH range of 6 to 10 for 0.5 to 24 hours. The aged silica hydrogel is then washed with a washing solution controlled to a predetermined pH range of 6 to 10 to remove impurities therefrom, and a silica hydrogel suitable as the oxide-forming substance is obtained.

Titanium belonging to Group IVB of the Periodic Table is preferably employed in the form of its hydroxide. Titanium hydroxide may, for example, be produced by adding titanium chloride or sulfate gradually into water at room temperature to effect hydrolysis. The thus obtained hydroxide hydrogel is then aged at a temperature of 50° C. to 100° C. for 0.5 to 24 hours, and filtered and washed to remove impurities. In an alternative, a solution of titanium chloride or sulfate is held at a temperature of 10° C. to 100° C., and an alkali, such as ammonia and sodium or potassium hydroxide, is gradually added into the solution to control it to a pH range of 4 to 11, whereby titanium hydroxide hydrogel is formed. The hydrogel is then aged at a temperature of 50° C. to 100° C. for 0.5 to 24 hours, and filtered and washed so that impurities may be removed.

Zirconium belonging to Group IVB of the Periodic Table is also preferably used in the form of hydroxide. Zirconium hydroxide hydrogel may, for example, be prepared by adding zirconyl chloride, sulfate or nitrate or the like gradually into water at room temperature to effect hydrolysis thereof. The hydroxide thus formed is then aged at a temperature of 50° C. to 100° C. for 0.5 to 24 hours, and its impurities are removed by filtration and washing. Alternatively, a solution of, say, zirconyl chloride, sulfate or nitrate is held at a temperature of 10° C. to 100° C., and an alkali, such as ammonia, and sodium or potassium hydroxide, is gradually added into the solution to control it to a pH range of 4 to 11, whereby zirconium hydroxide hydrogel is formed. Then, it is aged at a temperature of 50° C. to 100° C. for 0.5 to 24 hours, and its impurities are removed by filtration and washing.

The above-described hydrogels may be used in combination for preparing a carrier containing two or more oxides dispersed in the clay mineral. To prepare such a carrier, it is also possible to use, as the oxide-forming substance, either a mixed hydroxide hydrogel formed by coprecipitation or sedimentation and containing the two or more elements, or a compound containing the two or more elements.

Supporting the above-described catalytic metal component on the carrier formed from the clay mineral and oxide-forming substance (step (c)) can be carried out either concurrently with step (a) or after step (b). The same is true of auxiliary components, such as boron and phosphorous, which will be described hereinafter. The catalytic metal component defining a source of activity for the catalyst according to this invention may be prepared from any known starting material by any known method, if a predetermined quantity of such material can be uniformly distributed in the catalyst.

The starting material may be an individual element, or a compound containing two or more elements, and may be supported on the carrier by any known method that is appropriate for the material. Specific examples of the material include molybdenum compounds such as oxides (e.g., $MoO_3$ and $MoO_2$), molybdic acid and its salts [e.g., $H_2MoO_4$, $H_2MoO_3 \cdot H_2O$, $(NH_4)_2Mo_7O_{24}$, $(NH_4)_2MoO_4$], and chlorides (e.g., $MoCl_3$ and $MoCl_4$); and cobalt compounds such as oxides (e.g., $CoO$, $Co_2O_3$, $CoO_2$ and $Co_3O_4$, cobalt salts [e.g., $CoCl_2$, $CoCl_2 \cdot 6H_2O$, $Co(NO_3)_2 \cdot 6H_2O$, $CoSO_4 \cdot 7H_2O$, $Co(CH_3CO_2)_2 \cdot 4H_2O$ and $CoC_2O_4 \cdot 2H_2O$], cobalt hydroxide [$Co(OH)_2$], and cobalt carbonate (basic cobalt carbonate).

If nickel is to be incorporated, it is possible to employ nickel oxide (NiO), nickel salts such as $NiCl_2$, $NiBr_2$, $NiI_2$ and its hydrate, $Ni(NO_3)_2 \cdot 6H_2O$, $NiSO_4 \cdot 6H_2O$, $Ni(CH_3CO_2)_2 \cdot 4H_2O$ and $NiC_2O_4 \cdot 2H_2O$, nickel hydroxide [$Ni(OH)_2$], nickel carbonate, or nickel acetylacetonato. Tungsten may be incorporated in the form of oxides such as $WO_3$ and $WO_2$, tungstic acid and its salts such as ammonium tungstate, paratungstate or metatungstate, or the like. Copper is usually added in the form of copper nitrate, copper chloride, copper acetate, or copper sulfate.

A catalyst carrying a predetermined quantity of cobalt and molybdenum, for example, may be prepared by immersing the product from step (b), after drying and, if necessary, precalcining, in an ammoniacal aqueous solution containing both cobalt nitrate and ammonium molybdate followed by drying and calcining. It is also possible, however, to employ any other method well known to anybody of ordinary skill in the art, such as mixing, impregnation, kneading and ion exchange. Whichever method may be employed, there is virtually no difference in the performance of the catalyst if it carries or contains a predetermined quantity of the metal component. Some catalysts may contain a negligibly small amount of a metal salt, depending on the clay mineral employed, and the process used for preparing the catalyst. It is, however, so small that the power of the catalyst is not appreciably affected by any such foreign matter.

A catalyst carrying vanadium may, for example, be prepared by the process which is specifically disclosed in Japanese patent application No. 125689/1978 (Laid-Open No. 54036/1980), or U.S. Ser. No. 84,764. According to this process, a calcined product from step (d), which may carry other catalytic metal components than a vanadium component, is brought in the presence of hydrogen into contact with a heavy hydrocarbon oil containing large quantities of vanadium and sulfur, whereby vanadium and sulfur are released to form a layer of vanadium sulfide ($VS_x$) deposited on the carrier surface. The heavy hydrocarbon oil may be more effective if it contains more vanadium. Specifically, it is desirable to use a hydrocarbon oil containing at least 200 ppm, and preferably at least 400 ppm, of vanadium. The deposition of $VS_x$ may be carried out at a temperature of 350° C. to 450° C., preferably 390° C. to 420° C., and a hydrogen pressure of 30 to 250 atmospheres, preferably 80 to 160 atmospheres.

A catalyst carrying vanadium can also be prepared by bringing the product from step (b), after drying and, if necessary, precalcining, into a non-oily, non-hydrocarbon or polar medium containing a soluble vanadium compound, followed by appropriate sulfurization. The term "non-oily medium" means, for example, an aqueous or alcoholic solution. Examples of the soluble vanadium compound include vanadyl oxalate, vanadyl sulfate, ammonium metavanadate, acetylacetone vanadium and vanadium oxide. These vanadium compounds are often hardly soluble in water or the like, and therefore, the medium should preferably be heated, or made acidic or alkaline to improve the solubility of the compound therein. The solubility of ammonium metavanadate in water is as low as 0.52 g/100 g at 15° C. and 6.95 g/100 g at 96° C., in the vicinity of which its decomposition takes place. It is, therefore, preferable to add oxalic acid in order to improve the solubility of ammonium metavanadate and its adhesion to the carrier.

It is effective to incorporate one or more auxiliary components, such as fluorine and phosphorous, into the catalyst in order to relatively promote its activity for certain reactions, such as denitrification and reduction of Conradson carbon residue. It is effective to incorporate about 0.2 to 4.0% by weight of any of these auxiliary components into the catalyst in a customary manner. Fluorine may be incorporated in the form of, for example, hydrogen fluoride, HF; ammonium fluoride, $NH_4F$; or ammonium hydrogenfluoride, $NH_4HF_2$. Phosphorus may be in the form of, for example, its oxide, $P_2O_5$; phosphoric acid or its salt such as orthophosphoric acid, metaphosphoric acid, pyrophosphoric acid and ammonium phosphate. These compounds can be incorporated with the aforementioned third component. For this purpose, it is possible to employ a starting compound containing two or more of the elements involved, such as titanium phosphate, phosphotungstic acid, phosphomolybdic acid and ammonium phosphomolybdate.

A variety of known processes may be useful for incorporating the auxiliary components, such as fluorine and phosphorous, into the catalyst. Reference is made to Catalytic Engineering Course 10, "The Handbook of Catalysts", compiled The Japanese Society of Catalysts, Chijin Shokan, Publishers (1967).

The catalyst of this invention is very effective for the hydrotreatment of heavy hydrocarbon oils, particularly the decomposition of asphaltenes, removal of heavy metals, desulfurization and denitrification. It is also suitable for reducing their Conradson carbon residue, lowering their specific gravity, viscosity and pour point.

The catalytic hydrotreatment of heavy hydrocarbon oils using the catalyst of this invention can be performed in an ordinary flow reaction system provided with a fixed, moving, fluidized or ebullated bed, without causing any catalyst to be carried forward with the reaction product out of the reaction zone, if the shape of the catalyst, and the like are appropriately selected. The term "heavy hydrocarbon oil" herein used is intended to mean a heavy crude oil, a reduced crude oil, a vacuum residue, a crude oil extracted from tar sand, and a mixture thereof.

The hydrotreating of heavy hydrocarbon oils in the presence of the catalyst according to this invention may be carried out at a temperature of 350° C. to 450° C., preferably 390° C. to 420° C., a hydrogen pressure of 30 to 250 atmospheres, preferably 80 to 160 atmospheres, and a liquid space velocity of 0.1 to 10 Hr$^{-1}$, preferably 0.2 to 5 Hr$^{-1}$. The oil is treated in the presence of 100 to 2,000 volumes (100 to 2,000 Normal liters), preferably 500 to 1,000 Normal liters, of hydrogen or a gas rich in hydrogen at 15° C. per volume or liter of the oil at 15° C. at 1 atmosphere.

If the reaction temperature is lower than 350° C., the catalyst may fail to exhibit its activity fully and provide a practically acceptable degree of conversion during the hydrotreating operation. On the other hand, a reaction temperature exceeding 450° C. may give rise to active undesirable side reactions such as coking, and bring about reduction in the properties of the product oil and the activity of the catalyst.

A reaction pressure which is lower than 30 kg/cn$^2$G leads to heavy coking which makes it very difficult to maintain the activity of the catalyst at the right level. A pressure exceeding 250 kg/cm$^2$ causes heavy hydrocracking leading to an increased hydrogen consumption and a lower yield of the product oil, and also disadvantageously requires by far more expensive reactor and other related equipment. If the liquid space velocity is lower than 0.1 Hr$^{-1}$, the prolonged retention of the oil in the reaction area leads to degradation of its heavy fraction under heat, and reduction in the quality of the product oil, while a liquid space velocity exceeding 1-Hr$^{-1}$ exhibits a rate of conversion per pass which is practically too low. A hydrogen to oil ratio below 100 Normal liters/liter brings about deficiency of hydrogen in the reaction zone and poor transfer of hydrogen into the liquid, resulting in a coking reaction which may have an adverse effect on the catalyst and the product oil. A hydrogen to oil ratio exceeding 2,000 Normal liters/liter does not bring about any obstacle to the reactions involved, but does not improve the process of this invention in any way. The cost of a compressor used for the circulation of hydrogen increases with an increase in the amount of hydrogen, and becomes particularly high for circulation of hydrogen at a flow rate exceeding 2,000 Normal liters/liter. Thus, the ratio of 2,000 Normal liters/liter defines a practically acceptable upper limit to the process of this invention.

If the aforementioned requirements are satisfied, it is possible to reduce asphaltenes and vanadium effectively from a heavy hydrocarbon oil containing large quantities of asphaltenes and vanadium, while simultaneously removing sulfur, nitrogen and residual carbon substantially.

The hydrotreating process of this invention produces its best results when treating a heavy hydrocarbon oil containing large quantities of asphaltene and heavy metals. This is a more than sufficient proof of the fact that the process of this invention provides an epoch-making hydrotreating process. Any known hydrotreating process involving a fixed bed, or the like can economically treat only a heavy hydrocarbon oil containing not greater than about 5% by weight of asphaltenes and not greater than about 80 ppm of vanadium. According to the process of this invention, however, it is effectively possible to hydrotreat a heavy hydrocarbon oil containing as much as at least 5% by weight, or preferably at least 10% by weight, of asphaltenes, and at least 80 ppm, or preferably at least 150 ppm, of vanadium.

Specific examples of the hydrocarbon oil to be treated by the process of this invention include Venezuelan crude oil having a specific gravity (D 15/4° C.) of 1.004, and containing 11.8% by weight of asphaltenes, 1,240 ppm of vanadium, 2.36% by weight of sulfur and 3,600 ppm of nitrogen; an atmospheric distillation residue of heavy crude oil produced in the Middle and Near East, having a specific gravity (D 15/4° C.) of 0.987, and containing 6.5% by weight of asphaltenes, 93 ppm of vanadium, 4.45% by weight of sulfur and 2,000 ppm of nitrogen; and a vacuum distillation residue produced in the Middle and Near East, having a specific gravity (D 15/4° C.) of 1.036, and containing 6.2% by weight of asphaltene, 270 ppm of vanadium, 2.53% by weight of sulfur and 7,200 ppm of nitrogen.

The hydrotreating process of this invention is not only very effective for producing fuel oils or the like, but can also be effectively followed by the hydrodesulfurization, hydrocracking and catalytic cracking of the product oil, whereby a heavy hydrocarbon oil can be effectively converted into any desired final product. These combined processes will hereinafter be described by way of example.

Mode I-Combined Hydrotreating and Hydrodesulfurization

This combination is suitable for hydrotreating a heavy hydrocarbon oil containing large quantities of asphaltenes, vanadium, sulfur, etc. when a strict limitation is defined for the sulfur content of the product. The combined process may be used for producing ultrahigh grade fuel oils. Any known desulfurization process may be satisfactorily incorporated in the combination, using the same type of reaction system as used for hydrotreating as hereinbefore described.

The desulfurization is preferably carried out in the presence of a catalytic composed of at least one metal selected from among those belonging to Groups, VB, VIB and VIII of the Periodic Table, and supported on a refractory inorganic oxide carrier. The kind and amount of the metal depend on the properties of the oil to be treated, and the properties of the metals. If metals of Groups VIII and VIB are, for example, employed, it is desirable to incorporate 1 to 10% by weight of the Group VIII metal in the form of its oxide and 4 to 15% by weight of the Group VIB metal. Particularly preferred metals are Co, Mo, Ti, Ni and V. Any combination of these metals is satisfactory. They may be applied to the carrier by any customary method, such as immersion and spraying.

Suitable examples of the refractory inorganic oxide used for the carrier include alumina, silica, magnesia, boria, alumina-silica, alumina-magnesia, alumina-boria, silica-magnesia, silica-boria, magnesia-boria, alumina-silica-magnesia, alumina-silica-boria, alumina-magnesia-boria, and silica-magnesia-boria. Alumina and silica-alumina are particularly preferable.

The hydrodesulfurization process is carried out in the presence of the aforementioned catalyst at a temperature of 350° C. to 450° C., preferably 390° C. to 420° C., a hydrogen pressure of 30 to 250 kg/cm$^2$G, preferably 80 to 160 kg/cm$^2$G and a liquid space velocity of 0.1 to 5 Hr$^{-1}$, preferably 0.2 to 2 Hr$^{-1}$.

Mode II-Combined Hydrotreating and Hydrocracking

This combination is used for producing a product oil having a relatively wide range of applications, such as gasoline, lubricants and high grade fuel oils. For hydrocracking, it is satisfactory to use the same type of reaction system as used for hydrotreating or hydrodesulfurization.

The hydrocracking is preferably carried out in the presence of a solid acid catalyst composed of at least one transition metal, such as Cu and Ag belonging to Group IB of the Periodic Table, Cr, Mo and W of Group VIB, and Fe, Co, Ni, Ru, Rn, Pd, Os, Ir and Pt of Group VIII, supported on an amorphous carrier. Useful examples of the amorphous carrier include silica, alumina, magnesia zirconia, titania and boria, and their mixtures, such as silica-alumina, silica-magnesia, silica-zirconia and silica-alumina-magnesia. Natural or synthetic clays are also useful as the carrier. The metal or metals are preferably applied in the form of their oxide or sulfide, or the mixture thereof on the amorphous carrier.

It is further effective to add an accelerator, such as phosphorous, boron and/or a halogen, particularly fluorine. Fluorine may be incorporated in the form of hydrogen fluoride, ammonium fluoride, or the like. The catalyst preferably contains 0.2 to 10% by weight of fluorine.

It is also effective to incorporate 3 to 25% by weight of zeolite (crystalline aluminosilicate) into the hydrocracking catalyst. It is particularly preferable to use decationized molecular sieves having a relatively uniform pore diameter of about 6 to 16 Å. It is possible to use zeolite of the hydrogen or ammonium type, or of the type which is ion exchanged with ions of a metal such as Ni, Co and Mo, or a rare earth element such as cerium and lanthanum. Crystalline zeolite molecular sieves, such as mordenite and faujasite, exhibit particularly superior effects.

The hydrocracking operation is performed at a reaction temperature of 280° C. to 450° C., preferably 330° C. to 400° C., a reaction pressure of 30 to 200 kg/cm$^2$G, preferably 70 to 170 kg/cm$^2$G and a liquid space velocity of 0.3 to 6 Hr$^{-1}$, preferably 0.5 to 2 Hr$^{-1}$, and with a hydrogen to oil ratio of 200 to 2,000 Normal liters (hydrogen)/liter (oil), preferably 500 to 1,000 Normal liters/liter.

Mode III-Combined Hydrotreating and Catalytic Cracking

This combination is particularly suitable for producing gasoline. Any known process is effectively applicable for the catalytic cracking operation.

Generally, a catalytic cracking system comprises a reaction zone for decomposing hydrocarbon oils and a zone for regenerating the catalyst, and the process includes the following steps:

(1) Contacting the hydrocarbon oil with an acid catalyst in the reaction zone to convert it into a lower boiling light hydrocarbon oil (gasoline fraction) and to precipitate carbonaceous matter (coke) on the catalyst;

(2) separating the lower boiling light hydrocarbon oil from the catalyst particles having coke or the like adhering thereto in a separator to recover the decomposition product which is substantially free from any such catalyst particle;

(3) recovering the steam volatile hydrocarbons entrained with the catalyst particles having coke or the like adhering thereto, in a stripping zone at the lower portion of the separator;

(4) transferring the catalyst particles having coke or the like adhering thereto from the separator to the regenerating zone to burn the coke away from the catalyst particles with a regenerating gas containing oxygen to thereby regenerate the catalyst; and (5) recycling the regenerated catalyst into the reaction zone, where it is contacted by a fresh charge of hydrocarbon oil.

Either a moving or a fluidized bed system may be used for carrying out the aforementioned steps of the catalytic cracking operation, though a fluidized bed system is preferred. The fluidized bed system may be either a thickened phase fluidized bed system having a thickened phase in the reaction zone in a reaction tower, or a riser transfer reactor having a riser provided with a dispersed catalyst phase. It is, of course, possible to combine these two systems.

The reaction zone is provided with any of various natural or synthesized metal oxide catalysts. Suitable examples of the catalyst include natural or synthesized, amorphous metal oxides, such as zeolite, silica-alumina, silica-magnesia, silica-zirconia, silica-titania, silica-thoria, silica-alumina-magnesia and silica-alumina-zirconia, natural clay minerals, such as kaolinite and montmorillonite, and natural clay. If any catalyst contains alumina, it is desirable that it contain 10 to 35% by weight of alumina.

It is effective to include a predetermined quantity of at least one kind of natural or synthesized zeolite type catalytic cracking catalyst. It is particularly effective to employ a natural or synthesized crystalline aluminosilicate known as faujasite, mordenite, chabazite, zeolite X or zeolite Y. As these types of zeolite contain a considerably large quantity of Na$_2$O, it is necessary to reduce the content of Na to, say, 1% or less in order to provide the catalyst with an effective activity for decomposition. For this purpose, it is desirable to exchange the ions of Na with those of rare earth elements, magnesium, ammonium, or the like.

The catalyst has an average particle diameter which depends on the system employed for the catalytic cracking operation. If a moving bed system is employed, it is desirable to use a catalyst having an average particle diameter of several millimeters. For a fluidized bed system, it is suitable to use a catalyst having an average particle diameter of 20 to 150 microns, preferably 40 to 80 microns.

The operation in the reaction zone is carried out at a reaction temperature of 400° C. to 600° C., preferably 450° C. to 530° C., and a reaction pressure ranging from the atmospheric pressure to 8 kg/cm$^2$G, preferably up to 5 kg/cm$^2$G. The length of time for which the catalyst stays in the reaction zone depends on the system employed for the operation. A period of 5 to 15 minutes is suitable for the catalyst to stay in the reaction zone for a moving bed system. A duration of 0.1 second to 15 minutes is preferred for the catalyst in a fluidized bed system. If a riser transfer reactor is employed, a shorter period of, say, 0.1 to 10 seconds is preferred.

As regards the proportion of the catalyst to the hydrocarbon oil to be treated, it is impossible to establish a single standard, since they contact each other in different ways from one reaction system to another. If a thickened phase fluidized bed is involved, it is preferable to adopt a liquid space velocity of 0.2 to 5.0 kg of hydrocarbon/kg of catalyst/hour, while a catalyst/hydrocarbon oil ratio of 1:1 to 30:1 by weight is desirable for a riser transfer reactor.

Then, steam is introduced for releasing volatile matter from the catalyst having coke or the like adhering thereto after it is separated from the reaction product from the reaction tower or riser of the reaction zone. This treatment is carried out at a temperature of about 400° to 580° C. The amount of the steam to be introduced depends on the amount of the volatile matter carried on the catalyst, the amount of the catalyst in the separator, and other factors. It is, however, desirable to base it on a speed at which gas rises through the separator, and a range of about 0.2 to 2.0 m/sec. is preferred.

The catalyst carrying coke thereon is transferred from the separator into the regenerating tower. It is preferable to maintain a thickened, fluidized layer in the regenerating tower. The catalyst is kept in the tower for about 3 to 20 minutes, and treated at a temperature of about 570° C. to about 730° C. This regenerating temperature should never exceed 790° C.; otherwise, the catalyst for the catalytic cracking operation might undergo undesirable changes in structure and composition, and lose its activity.

According to this invention, it is further possible to add antimony or the like into the catalyst in order to improve its resistance to contamination with metals as disclosed in Japanese Laid-Open Patent Application No. 68092/1977, or incorporate a noble or base metal into the catalyst in order to improve the efficiency with which carbon monoxide is oxidized into carbon dioxide during the regeneration of the catalyst.

Mode IV-Combined Hydrotreating, Hydrodesulfurization, Hydrocracking or Catalytic Cracking This combination is mainly used for the purpose of producing ultrahigh grade gasoline, or ultrahigh grade gasoline and lubricants. This combination is effectively applicable for the production of gasoline and lubricants from heavy oils having properties which are so bad that if the Mode II or III combination is used, the individual processes are overloaded, and the catalyst has an unduly shortened life. The procedures described for the Mode I, II and III combinations may be repeated for the individual processes in the combination.

Figure 4:
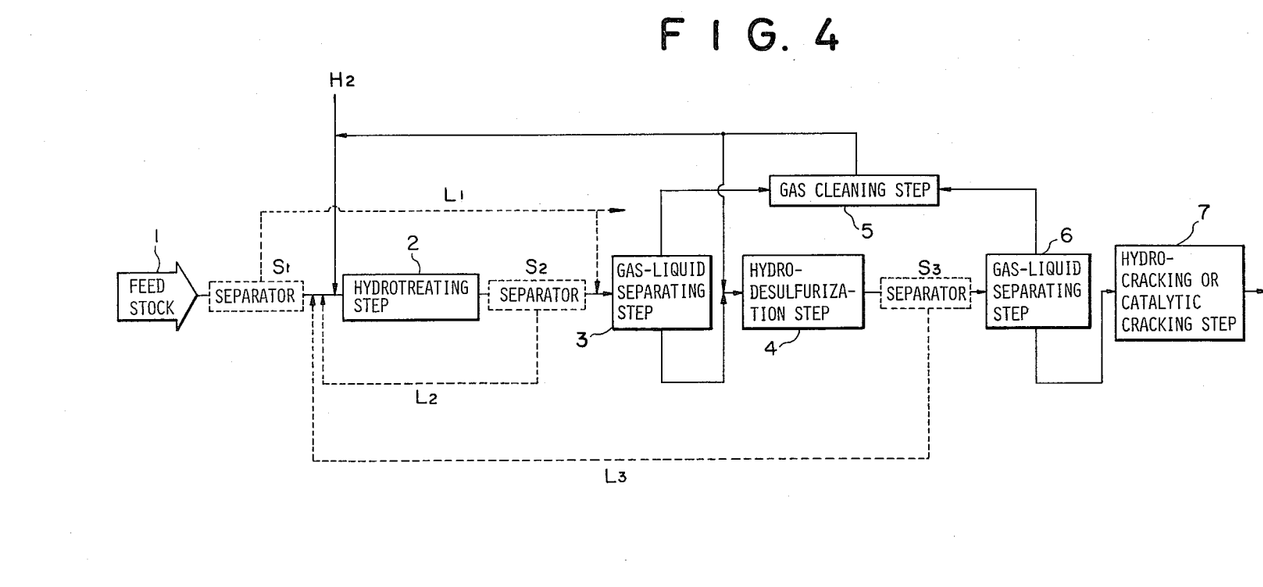
FIG. 4 is a flow sheet illustrating the process embodying this invention.

FIG. 4 illustrates a flow sheet exemplifying the processes involved in the Mode IV combination. The heavy hydrocarbon oil 1 to be treated is introduced into a hydrotreating step 2, and the hydrotreated oil is transferred into a gas-liquid separating step 3 in which the reaction product is separated into a liquid and a gas. The liquid reaction product is transferred into a hydrodesulfurization step 4, while the gaseous reaction product is introduced into a gas cleaning step 5. Under some conditions, it is, of course, possible to introduce the reaction product directly into the hydrodesulfurization step 4 without any gas-liquid separation. The oil is subjected to desulfurization and other related treatment in the hydrodesulfurization step 4, and then transferred into a hydrocracking (or catalytic cracking) step 7 directly or after gas-liquid separation in a gas-liquid separating step 6, whereby it is converted into ultrahigh grade gasoline, a lubricant, or the like.

According to another example of application of the Mode IV combination, the oil to be treated is introduced into a separator $S_1$, and separated into a light fraction and a heavy fraction. Then, only the heavy fraction is fed into the hydrotreating step 2, while the light fraction is transferred through a line $L_1$ into the desulfurization step 4 or the catalytic cracking (or hydrocracking) process 7. It is also effective to recycle the hydrotreated heavy fraction into the separator $S_1$.

According to another example of application, the hydrotreated heavy hydrocarbon oil is separated by a separator $S_2$ into a heavy fraction and a light fraction, and only the light fraction is introduced into the desulfurization step 4, while the heavy fraction is recycled into the hydrotreating step 2 through a line $L_2$. A further example comprises separating the hydrodesulfurized oil from the step 4 into a light fraction and a heavy fraction by a separator $S_3$, and transferring the light fraction into the catalytic cracking (or hydrocracking) step 7, while the heavy fraction is returned into the hydrotreating step 2 through a line $L_3$.

Although the aforementioned three examples of application have been based on Mode IV, they are also applicable to Mode I, II or III.

The invention will now be described with reference to examples. These examples are merely intended for describing the invention more specifically, and do never form any limitation to the scope of this invention.

Example of Preparation of a Clay Mineral Consisting Mainly of Magnesium Silicate of the Double-Chain Structure Clayey Spanish sepiolite ores and attapulgite sold by Engelhard, U.S.A. under the name of Sol Speedi Dri (SSD) were each dried with hot air at about 120° C. for six hours, and ground in a ball mill for about six hours, whereby a powder each of sepiolite and attapulgite having a particle size of about 50 mesh or finer was prepared. At least 90% of the particles has a particle size of 100 mesh or finer. Their chemical compositions were as shown in Table 1 below.

TABLE 1

| Chemical Composition (wt %) | Spanish sepiolite | Attapulgite SSD (Engelhard) |
|---|---|---|
| $SiO_2$ | 59.8 | 58.0 |
| MgO | 25.9 | 8.0 |
| $Al_2O_3$ | 2.6 | 9.3 |
| $Fe_2O_3$ | 0.7 | 3.0 |
| CaO | 0.5 | 2.0 |

Comparative Example 100 g of the sepiolite powder shown in Table 1 and about one liter of distilled water were placed in a paddle type agitator, and vigorously agitated for about 55 minutes to form a gel. About one more liter of water was then added to the gel. After the pH value of the solution was adjusted to about 8 with 28% aqueous ammonia, it was strongly agitated for about five minutes. The resulting gel was dehydrated through a vacuum filter to yield a cake weighing about 250 g. The cake was extrusion molded into 1.2 mm dia. cylindrical pieces. The molded products were dried with hot air at about 120° C. for six hours, and precalcined at 500° C. for three hours.

400 ml of warm water were added into 151.9 g of ammonium molybdate. Added thereinto was an aqueous solution obtained by dissolving 160.5 g of cobalt nitrate in 400 ml of distilled water, followed by addition of 500 ml of aqueous ammonia having a concentration of 25% by weight. 35 ml of the solution thus obtained were diluted with 5 ml of distilled water. 50 g of the precalcined products obtained as described above were uniformly impregnated with the diluted solution, and after they were left in a sealed condition overnight, they were allowed to stand at room temperature for drying. Then, they were dried with hot air at 120° C. for three hours, and calcined at 500° C. in an air stream for three hours, whereby Catalyst I having Mo and Co supported on sepiolite was obtained. Catalyst I was found to have the properties shown in Table 2. The surface area, pore volume and average pore diameter were determined by the mercury penetration method.

Example 1

500 g of $MgCl_2.6H_2O$ were dissolved in two liters of distilled water, and the solution was held at room temperature. About 0.9 liter of a solution containing 250 g/liter of sodium hydroxide was added gradually into the magnesium chloride solution under agitation to control it to pH 11, whereby a magnesium hydroxide hydrogel was precipitated. It was then aged at a temperature of 80° C.±5° C. for 12 hours. After filtration, the hydrogel was washed with distilled water controlled to pH 9 with 28% aqueous ammonia until virtually no $Cl^-$ ion was detected, whereby there was obtained a cake weighing about 250 g and containing about 30% by weight of magnesium hydroxide calculated as magnesium oxide. 80 g of the cake, 80 g of the aforementioned sepiolite powder and about one liter of distilled water were placed in a paddle type agitator, and strongly agitated for about 55 minutes to form a gel. About one more liter of water was then added to the gel. After the gel was controlled to have a pH value of about 10 with 28% aqueous ammonia, it was strongly agitated for about five minutes. Then the gel was formed into a cake in the same manner as that of Comparative Example and the cake was molded, dried, pre-calcined and supported with Mo and Co in the same manner as that of Comparative Example, whereby Catalyst II was obtained. Its properties are shown in Table 2.

Example 2

An aqueous solution containing 76.6 g/liter of aluminum sulfate in terms of $Al_2O_3$ was heated to and held at 100° C. 18 liters of deionized water were placed in a vessel having an external heater, and heated to 100° C. Then, 12 liters of the aforementioned aqueous solution of aluminum sulfate were added into the deionized water, and while they were vigorously agitated, 4.4 liters of 28% aqueous ammonia were added thereinto quickly, whereby a seed aluminum hydroxide hydrosol slurry was formed. The slurry was aged at 100° C. and pH 9 for 60 minutes.

Then, two liters of the aqueous aluminum sulfate solution were added into the slurry, whereupon the slurry reduced its viscosity sharply and showed a pH value of 4. After five minutes, 0.8 liter of 28% aqueous ammonia was added into the slurry, whereupon the slurry increased its viscosity and showed a pH value of 9 again. After this cycle of the sequential pH variation operation, the slurry was aged at 100° C. for 20 minutes while it was slowly agitated. The procedures of the cycle were then repeated five times more to obtain an alumina hydrogel. The hydrogel was filtered and washed until no sulfuric acid radical was detected in the filtrate, whereby a cake having an aluminum hydroxide content of 20% by weight in terms of $Al_2O_3$ was obtained. Using 125 g of the thus obtained cake and 83 g of the sepiolite powder, Catalyst III was prepared in the same manner as that of Example 1. The properties of Catalyst III are shown in Table 2.

Example 3

300 g of sodium silicate conforming to JIS 3 (Japanese Industrial Standard) were dissolved in 4.5 liters of distilled water, and the solution was held at room temperature. Hydrochloric acid containing 35% by weight of hydrogen chloride was gradually added into the sodium silicate solution under agitation to control it pH 7. The mixed solution was aged at 50° C. for 20 hours to form a gel. The gel was subjected to vacuum filtration and washed with distilled water until virtually no $Na^+$ ion was detected, whereby about 9 kg of a cake having a $SiO_2$ content of about 10% by weight were obtained. Using 250 g of the thus obtained cake and 83 g of the sepiolite powder, Catalyst IV was prepared in the same manner as that of Example 1. The properties of Catalyst IV are shown in Table 2.

Example 4

1,000 g of titanium tetrachloride were gradually added into two liters of distilled water while it was being cooled, and six more liters of distilled water were added into the solution. Then, 28% aqueous ammonia was added gradually into the solution under agitation until the resulting mixture had a pH value of 8. The mixture was then aged at a temperature of 98° C. to 100° C. for 20 hours, whereby a titanium hydroxide hydrogel was obtained. The hydrogel was subjected to vacuum filtration and washed with distilled water until virtually no $Cl^-$ ion was detected in the filtrate, whereby about 1,600 g of a cake containing about 25% by weight of titanium hydroxide in terms of $TiO_2$ was obtained. Using the thus obtained cake and the sepiolite powder in different proportions Catalysts V to VIII were prepared in the same manner as that of Example 1; Catalyst V was prepared from 100 g of the cake and 83 g of the sepiolite powder, Catalyst VI from 200 g of the cake and 56 g of the sepiolite powder, Catalyst VII from 300 g of the cake and 28 g of the sepiolite powder, and Catalyst VIII from 360 g of the cake and 11 g of the sepiolite powder. In addition, Catalyst IX was prepared in the same manner as Example 1 using 100 g of the cake and 83 g of the attapulgite powder shown in Table 1. Catalyst X was prepared by repeating the procedures for preparing Catalyst V, except that nickel nitrate was used in place of cobalt nitrate. The properties of these catalysts are also shown in Table 2.

Example 5

500 g of zirconyl chloride were dissolved in four liters of distilled water, and 28% aqueous ammonia was gradually added into the solution until it showed a pH value of 8. The resulting mixture was then aged at a temperature of 98° C. to 100° C. for three hours, whereby a zirconium hydroxide hydrogel was obtained. The hydrogel was subjected to vacuum filtration and washed with distilled water until virtually no $Cl^-$ ion was detected in the filtrate, whereby about 700 g of a cake containing about 25% by weight of zirconium hydroxide in terms of $ZrO_2$ was obtained. Using 100 g of the thus obtained cake and 83 g of the sepiolite powder, Catalyst XI was prepared in the same manner as that of Example 1. The properties of Catalyst XI are shown in Table 2.

Example 6

Using 63 g of the cake obtained in Example 2, 125 g of the cake obtained in Example 3 and 83 g of the sepiolite powder, Catalyst XII was prepared in the same manner as that of Example 1. The properties of Catalyst XII are shown in Table 2.

Example 7

A solution, obtained by dissolving 355 g of orthoboric acid in 2.8 liters of distilled water heated to about 50° C., was added into 2 kg of the sepiolite powder, and they were kneaded for about one hour in a kneader. The kneaded product had a water content of about 60% by weight. The kneaded product was molded through a die having a 1.0 mm dia. hole. The molded products were dried with hot air at 120° C. for three hours, and precalcined at 500° C. for three hours, whereby about 2 kg of a precalcined product were obtained. On the precalcined product were supported Mo and Co in the same manner as that of Comparative Example to obtain Catalyst XIII. The properties of Catalyst XIII are shown in Table 2.

Example 8

100 g of titanium hydroxide cake obtained in Example 4 and 83 g of the sepiolite powder shown in Table 1 were treated in the same manner as that of Example 1 to obtain a gel. The gel was then formed into a cake in the same manner as that of Comparative Example. The cake was further molded, dried and precalcined in the same manner as that of Comparative Example to obtain a carrier. The carrier was contacted with a heavy hydrocarbon oil containing a large quantity of vanadium as shown in Table 3 under the hydrotreating conditions shown in Table 4. After 100 hours of the treatment, there was obtained Catalyst XIV carrying vanadium. Its properties are shown in Table 2. A fixed bed flow type reaction system having a reactor filled with 50 cc of the carrier was used for preparing Catalyst XIV. Catalyst XIV contained about 9% by weight of vanadium.

TABLE 4

| Reaction temperature (°C.) | 405 |
|---|---|
| Reaction pressure (atmospheres) | 140 |
| LHSV (Hr$^{-1}$) | 1.0 |
| H$_2$/oil ratio (Normal liters/liter) | 1,000 |

After about 20 hours of the operation, about 50 cc of the reaction product were sampled, and analyzed. The operation was carried out by using a fixed bed flow type reaction system having a reactor filled with 50 cc of catalyst. Table 5 shows the asphaltene, vanadium and sulfur contents of the hydrotreated oil in relation to the catalysts employed. Catalysts II, III, IV, V, XI, XII and XIII containing magnesia, alumina, silica, titania, zirconia, silica-alumina and boria, respectively, showed an improved activity for asphaltene decomposition, vanadium removal and desulfurization, as compared with Catalyst I having a carrier composed solely of sepiolite. A similar improvement in catalytic activity was observed with Catalyst IX having titania added into attapulgite, Catalyst X containing nickel instead of cobalt on Catalyst V, and Catalyst XIV carrying vanadium.

TABLE 5

| Catalyst No. | Amount in Product Oil | | |
|---|---|---|---|
| | Asphaltenes (wt %) | Vanadium (ppm) | Sulfur (wt %) |
| I | 4.0 | 198 | 3.8 |
| II | 3.2 | 174 | 3.0 |
| III | 2.8 | 168 | 2.4 |
| IV | 3.6 | 185 | 3.2 |
| V | 2.0 | 123 | 1.8 |
| IX | 2.7 | 149 | 2.3 |
| X | 1.8 | 120 | 1.6 |
| XI | 2.4 | 140 | 2.2 |
| XII | 3.7 | 187 | 3.4 |
| XIII | 3.3 | 161 | 3.0 |
| XIV | 3.5 | 178 | 3.2 |

Figure 3:
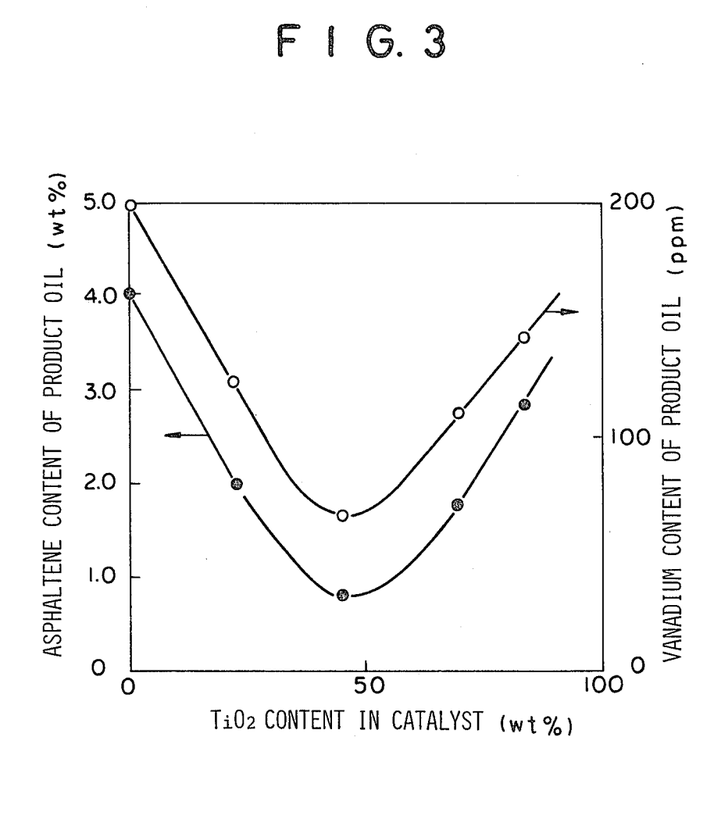
FIG. 3 shows the effects, on the activity of the catalyst, of variation in the amount of titania added into sepiolite in Example 1.

FIG. 3 shows the results of the hydrotreating operation

TABLE 2

| Catalyst No. | I | II | III | IV | V | VI | VII | VIII | IX | X | XI | XII | XIII | XIV |
|---|---|---|---|---|---|---|---|---|---|---|---|---|---|---|
| Surface area (m$^2$/g) | 104 | 72 | 135 | 116 | 105 | 98 | 105 | 58 | 98 | 104 | 110 | 95 | 90 | 96 |
| Pore volume (cc/g) | 0.70 | 0.62 | 0.59 | 0.59 | 0.57 | 0.56 | 0.52 | 0.31 | 0.59 | 0.57 | 0.55 | 0.88 | 0.51 | 0.52 |
| 75-100A | 0.02 | 0.02 | 0.09 | 0.09 | 0.03 | 0.03 | 0.02 | 0.01 | 0.02 | 0.03 | 0.03 | 0.04 | 0.09 | 0.03 |
| 100-200A | 0.12 | 0.07 | 0.27 | 0.14 | 0.16 | 0.14 | 0.19 | 0.10 | 0.15 | 0.17 | 0.17 | 0.08 | 0.14 | 0.15 |
| 200-400A | 0.24 | 0.13 | 0.19 | 0.14 | 0.32 | 0.23 | 0.28 | 0.17 | 0.22 | 0.33 | 0.27 | 0.16 | 0.20 | 0.20 |
| 400A or above | 0.32 | 0.40 | 0.04 | 0.22 | 0.06 | 0.16 | 0.03 | 0.03 | 0.20 | 0.04 | 0.18 | 0.60 | 0.18 | 0.05 |
| Average pore diameter (A) | 269 | 344 | 175 | 203 | 217 | 236 | 198 | 213 | 241 | 219 | 200 | 371 | 227 | 217 |

Example 9

Catalysts I to XIV were tested for hydrotreating the heavy hydrocarbon oil shown in Table 3 under the reaction conditions shown in Table 4.

TABLE 3

| Crude oil produced in Venezuela | |
|---|---|
| Specific gravity (D 15/4° C.) | 1.004 |
| Asphaltene content (wt %) | 11.8 |
| Sulfur content (wt %) | 5.4 |
| Vanadium content (ppm) | 1,240 |
| Nickel content (ppm) | 106 |
| Nitrogen content (ppm) | 5,900 |
| Conradson carbon residue (wt %) | 15.9 | by using the catalysts having different titania contents. Catalysts V, VI, VII and VIII contained about 25%, 50%, 75% and 90%, respectively, by weight of titania relative to sepiolite, while Catalyst I did not contain titania. In FIG. 3, the 'white' circles show the vanadium content of the product oil, and the 'black' circles the asphaltene content thereof. All of the catalysts containing titania showed an improved activity for asphaltene decomposition and vanadium removal, as compared with Catalyst I. It is also appreciated that the catalytic activity increases with the increase in the titania content from 0 to about 50% but decreases with the further increase in the titania content.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed is:

1. A catalyst for hydrotreating heavy hydrocarbon oils, comprising:
   a carrier which is a calcined composite of a mixture of a clay mineral consisting mainly of magnesium silicate having a double-chain structure and at least one oxide-forming substance selected from the group consisting of compounds of magnesium, boron, silicon, titanium and zirconium and capable of forming an oxide upon calcination; and
   at least one catalytic metal component composited with said carrier, the metal of said catalytic metal component being selected from the group consisting of the metals belonging to Group VB, VIB, VIII and IB of the periodic Table;
   said catalyst containing between about 5 and about 80% by weight of the oxide formed from said oxide-forming substance and between about 0.1 and about 20% by weight of said catalytic metal component in terms of elemental metal;
   said catalyst having a pore volume of between about 0.5 and about 2.0 cc/g, an average pore diameter of between about 100 and about 500 Å, and a surface area of between about 40 and about 400 m²/g.

2. A catalyst as set forth in claim 1, wherein said clay mineral is selected from the group consisting of sepiolite, attapulgite, palygorskite and mixtures thereof.

3. A catalyst as set forth in claim 1, wherein the metal of said catalytic metal component is at least one member selected from the group consisting of vanadium, chromium, molybdenum, tungsten, cobalt, nickel and copper.

4. A method of preparing a catalyst, comprising the steps of:
   (a) commingling a clay mineral consisting mainly of magnesium silicate having a double-chain structure with at least one oxide-forming substance selected from the group consisting of compounds of the elements belonging to Group IIA, IIIA, IVA and IVB of the Periodic Table and capable of forming an oxide upon calcination, in the presence of water to form a mixture having a water content of between about 40 and about 80% by weight;
   (b) molding the mixture;
   (c) supporting at least one catalytic metal component on the mixture, the metal of said metal component being selected from the group consisting of metals belonging to Groups VB, VIB, VIII and IB of the Periodic Table, such that said catalyst may contain between about 0.1 and about 20% by weight of said catalytic metal component calculated on elemental metal; and
   (d) calcining the mixture.

5. A method as set forth in claim 4, wherein step (a) comprises kneading said clay mineral, said oxide-forming substance and about 40 to 80% by weight of water.

6. A method as set forth in claim 4, wherein step (a) comprises mixing said clay mineral, said oxide-forming substance and water in an amount at least about three times by weight as much as said clay mineral to form a paste, and controlling the water content of the paste to about 40 to 80% by weight.

7. A method as set forth in claim 4, wherein the sequence of steps is (a), (b), (c) and (d) and wherein step (c) includes drying the molded mixture to obtain a dried mixture having a solids content of at least about 25% by weight, precalcining the dried mixture at a temperature of 200° to 800° C. for 0.1 to 10 hours and impregnating the precalcined mixture with a solution containing a compound containing the metal of the catalytic metal component.

8. A method as set forth in claim 4, wherein said oxide-forming substance is magnesium hydroxide hydrogel obtained by adding to an aqueous solution containing a magnesium salt, while maintaining it at a temperature of 10° to 100° C., an alkaline solution to control it to pH 6 to 11 to thereby form a magnesium hydroxide hydrogel, and aging said hydrogel at a temperature of 50° to 100° C. for 0.5 to 24 hours.

9. A method as set forth in claim 4, wherein said oxide-forming substance is a silica hydrogel obtained by adding to an aqueous solution containing 1 to 8% by weight of sodium silicate in terms of silica, while maintaining it at a temperature of 10° to 70° C., a mineral acid to control it to pH 6 to 10 to thereby form a silica hydrogel, and aging said hydrogel at a temperature of 10° to 100° C. and a pH of 6 to 10 for 0.5 to 24 hours.

10. A method as set forth in claim 4, wherein said oxide-forming substance is titanium hydroxide hydrogel obtained by adding to an aqueous solution of a titanium salt, while maintaining it at a temperature of 10° to 100° C., an alkaline solution to control it to pH 4 to 11 to thereby form a titanium hydroxide hydrogel, and aging said hydrogel at a temperature of 50° to 100° C. for 0.5 to 24 hours.

11. A method as set forth in claim 4, wherein said oxide-forming substance is titanium hydroxide hydrogel obtained by adding a titanium salt or an aqueous solution of a titanium salt gradually into water at room temperature to hydrolize said titanium salt into titanium hydroxide and to form a hydrogel, and aging said hydrogel at a temperature of 50° to 100° C. for 0.5 to 24 hours.

12. A method as set forth in claim 4, wherein said oxide-forming substance is zirconium hydroxide hydrogel obtained by adding to an aqueous solution of a zirconium salt, while maintaining it at a temperature of 10° to 100° C., an alkaline solution to control it to pH 4 to 11 to thereby form zirconium hydroxide hydrogel, and aging said hydrogel at a temperature of 50° to 100° C. for 0.5 to 24 hours.

13. A method as set forth in claim 4, wherein said oxide-forming substance is zirconium hydroxide hydrogel obtained by adding a zirconium salt or an aqueous solution thereof gradually into water at room temperature to hydrolize said zirconium salt into zirconium hydroxide and to form a hydrogel, and aging said hydrogel at a temperature of 50° to 100° C. for 0.5 to 24 hours.

14. A method as set forth in claim 4, wherein said catalytic metal component includes a vanadium component and wherein the step of supporting the vanadium component includes contacting the calcined mixture with a heavy hydrocarbon oil containing at least 200 ppm by weight of vanadium at a temperature of between 350° C. and 450° C. and a pressure of 30 to 250 atmosphere in the presence of hydrogen.

* * * * *